United States Patent [19]
Drew

[11] 3,736,789
[45] June 5, 1973

[54] TEST AND CALIBRATING DEVICE FOR INTRA-OCULAR PRESSURE INSTRUMENTS

[76] Inventor: Norman J. Drew, 229 South St., Glens Falls, N.Y. 12801

[22] Filed: Aug. 24, 1971

[21] Appl. No.: 174,389

[52] U.S. Cl..................73/1 B, 73/432 SD, 128/2 T
[51] Int. Cl.............................................G01l 25/00
[58] Field of Search......................73/1 B, 4 R, 80, 73/432 SD; 128/2 T

[56] References Cited
UNITED STATES PATENTS

| | | | |
|---|---|---|---|
| 3,287,957 | 11/1966 | Martens | 73/1 B |
| 3,406,681 | 10/1968 | Zandman | 128/2 T |

FOREIGN PATENTS OR APPLICATIONS

| | | | |
|---|---|---|---|
| 150,275 | 12/1961 | U.S.S.R. | 73/4 R |

*Primary Examiner*—Richard C. Queisser
*Assistant Examiner*—Joseph W. Roskos
*Attorney*—Clarence A. O'Brien and Harvey B. Jacobson

[57] ABSTRACT

An eyeball simulating sphere enclosed within a block and exposed through an oval opening in at least one face of the block, is internally pressurized by a squeeze bulb to any desired pressure in order to test or calibrate tonometers or provide a practice model for digital palpation. The sphere is made of a flexible material and connected by tubing to the squeeze bulb and a pressure gauge.

9 Claims, 3 Drawing Figures

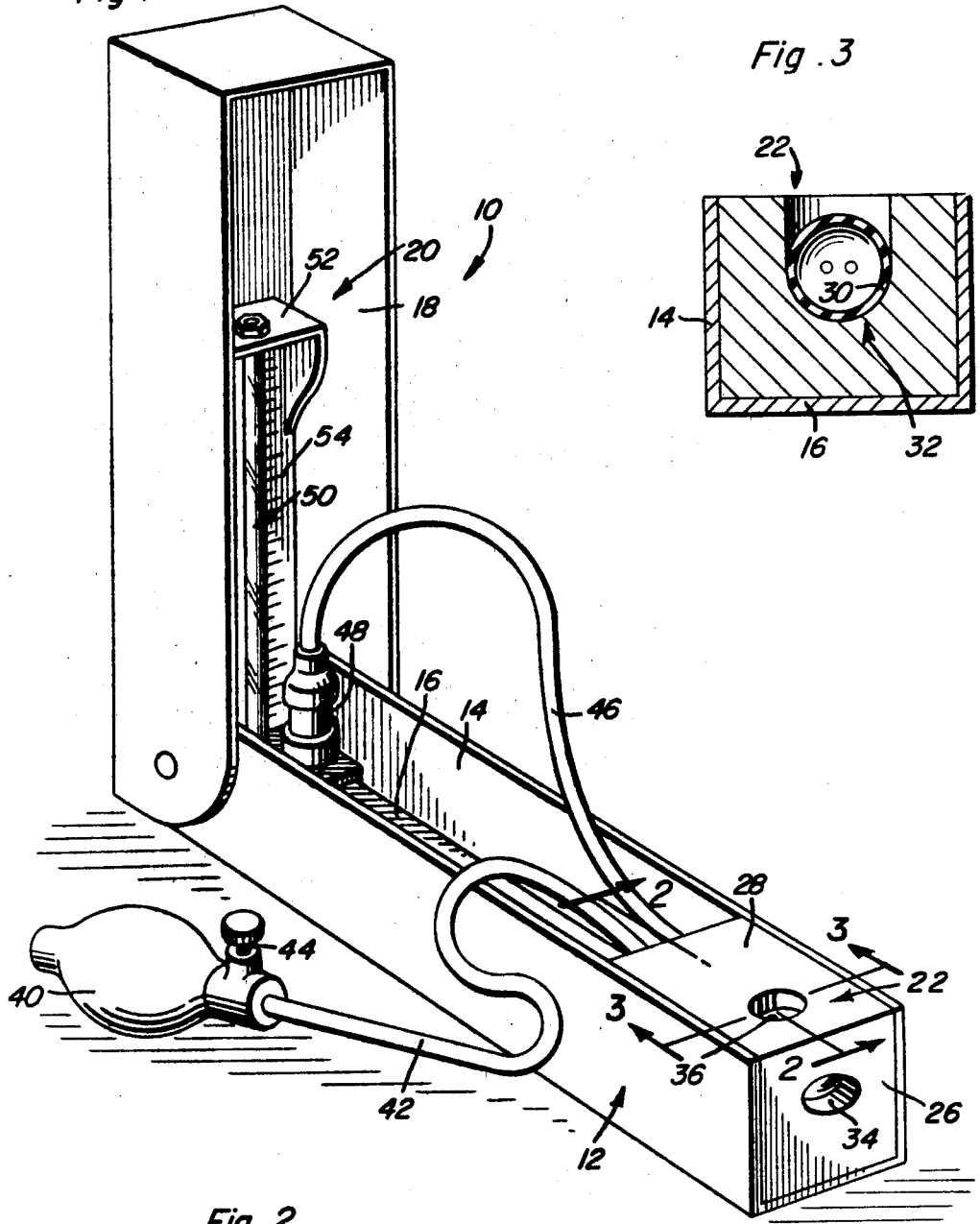
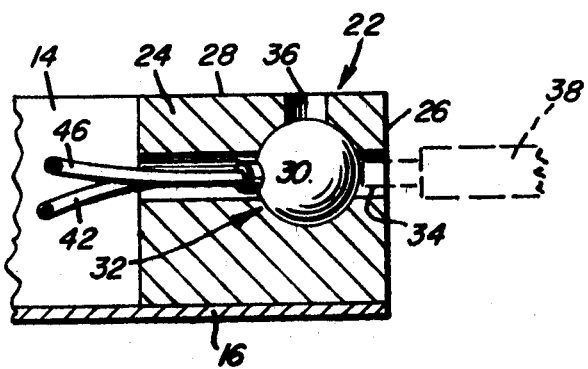

TEST AND CALIBRATING DEVICE FOR INTRA-OCULAR PRESSURE INSTRUMENTS

This invention relates to the measurement of pressure within the eye and the determination of hardness of the eyeball which is extremely important in the diagnosis of glaucoma or hypotony. Such eyeball measurements are routinely made with intra-ocular pressure measuring instruments or tonometers and other instruments used to monitor the flow of fluids within the eye. Such instruments require, however, calibration of their readings. Calibration has heretofore been effected with respect to special types of instruments and such calibrating apparatus has been both complex and costly.

It is therefore an important object of the present invention to provide a device for calibrating as well as checking on the accuracy of readings associated with intraocular pressure measuring instruments.

A further object is to provide a practice model in the form of a simulated eyeball whereby practitioners may develop skill in determining relative hardness of the eyeball by digital palpation involving the alternate pressing of the index fingers on the eyeball.

In accordance with the present invention, a flexible hollow sphere simulating an eyeball is retained within the cavity of a rigid block and is internally pressurized by means of a squeeze bulb to a desired pressure simulating intra-ocular pressure of the eye. The hollow, internally pressurized sphere may be exposed through openings in two faces of the block into which a probe may be received, for example, from a tonometer instrument when it is desired to check on the accuracy of its readings or recalibrate the instrument. The internal pressure of the eyeball simulating sphere is accordingly raised or lowered to the desired value as indicated on a pressure gauge to which the hollow sphere is connected by tubing such as a micromanometer mercury gauge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical apparatus constructed in accordance with the present invention;

FIG. 2 is a partial sectional view taken substantially through a plane indicated by section line 2—2 in FIG. 1; and FIG. 3 is a transverse sectional view taken substantially through a plane indicated by section line 3—3 in FIG. 1.

Referring now to the drawings in detail, FIG. 1 illustrates the apparatus of the present invention generally denoted by reference numeral 10 which is shown in its open condition. The apparatus includes an open case generally referred to by reference numeral 12 having side walls 14 innerconnected by a bottom wall 16. The case is pivotally connected at one end to a cover 18 within which a pressure measuring gauge is mounted and generally referred to by reference numeral 20. An eyeball practice and testing device is mounted within the case at an open end remote from the end to which the cover 18 is pivotally connected and is generally referred to by reference numeral 22.

The eyeball device 22 includes a rigid receptacle block 24 made of a suitable material, such as wood or a rigid plastic, the block being rectangular in shape so as to present a front face 26 exposed at the open end of the case 12 and a top face 28. A spherical cavity 30 is formed within the block within which an eyeball simulating sphere 32 is enclosed.

The eyeball simulating sphere 32 is made of a flexible material, such as rubber or fabric that is substantially air impermeable so that it may be internally pressurized with air to a desired pressure. The sphere 32 is exposed by means of an oval shaped opening 34 through the front face 26 and through a similar opening 36 at right angles thereto through the top face 28. The openings 34 and 36 are dimensioned to simulate the open human eye and to receive either the index fingers of a practitioner, such as an optometrist or an ophthalmologist, as well as the probe portion of an instrument 38 being tested or calibrated as shown by dotted line in FIG. 2. The openings 34 and 36 are placed on the faces 26 and 28 so as to simulate the position of the human eye when a patient is reclining and sitting with the eye looking upward or forwardly, respectively.

The internal pressure of the eyeball simulating sphere 32 is controlled by a hand manipulated squeeze bulb 40 connected to the sphere 32 by the tube 42. A selectively actuated vent valve 44 of any conventional design may be connected to the squeeze bulb in order to relieve pressure by an adjusted amount. Accordingly, the pressure within the eyeball simulating sphere may be raised or lowered to a desired value.

In order to determine the internal pressure of the sphere, it is connected by the tubing 46 to the pressure measuring device 20 which in the illustrated embodiment includes a mercury reservoir 48 to which the tubing 46 is connected. Mercury from the reservoir is conducted into an indicating tube 50 mounted within the cover 18 by means of the bracket 52 and a graduated scale plate 54. Accordingly, the internal pressure of the eyeball simulating sphere may be adjusted to a desired pressure reading simulating the intraocular pressure of the eyeball.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for calibrating a pressure measuring instrument having a probe, comprising a mounting block having at least one exposed face, said block being provided with an internal cavity and an opening extending therefrom through said face to receive said probe, a flexible hollow member lining the cavity and enclosing a pressure chamber therein, means connected to the flexible member for pressurizing the chamber while the flexible member is exposed through said opening and measuring means connected to the flexible member for indicating pressure within the chamber.

2. The combination of claim 1 wherein said opening in the face is oval shaped to simulate the eyelid opening of a human eye.

3. The combination of claim 2 wherein said chamber pressurizing means includes a squeeze bulb and a selectively operated vent valve.

4. The combination of claim 3 wherein the measuring means comprises a pressure reading gauge.

5. The combination of claim 1 wherein said chamber pressurizing means includes a squeeze bulb and a selectively operated vent valve.

6. Apparatus for providing practice in determining the hardness and intra-ocular pressure of an eyeball, comprising a rigid receptacle having a practice face, eyeball simulating chamber means enclosed within the receptacle and exposed through an opening in said face, means for controllably pressurizing the chamber means to simulate intra-ocular pressure, and means connected to the chamber means for indicating the pressure.

7. The combination of claim 6 wherein said chamber means is made of a flexible material.

8. The combination of claim 7 wherein said opening in the face is oval-shaped and dimensioned to receive the probe of a tonometer or the index finger of a hand.

9. The combination of claim 6 wherein said opening in the face is oval-shaped and dimensioned to receive the probe of a tonometer or the index finger of a hand.

* * * * *